(12) United States Patent
Tracht et al.

(10) Patent No.: US 8,672,352 B2
(45) Date of Patent: Mar. 18, 2014

(54) VEHICLE SEAT ASSEMBLY WITH SEAT PAD PROTECTION MEMBER

(75) Inventors: Michael L. Tracht, Ingolstadt (DE); Peter Festag, Erding (DE)

(73) Assignee: Lear Corporation, Southfield, MI (US)

( * ) Notice: Subject to any disclaimer, the term of this patent is extended or adjusted under 35 U.S.C. 154(b) by 142 days.

(21) Appl. No.: 12/940,089

(22) Filed: Nov. 5, 2010

(65) Prior Publication Data

US 2011/0193327 A1    Aug. 11, 2011

(30) Foreign Application Priority Data

Feb. 10, 2010    (DE) .......................... 10 2010 001 772

(51) Int. Cl.
  *B60R 21/207*    (2006.01)
  *B60R 21/2338*    (2011.01)

(52) U.S. Cl.
  USPC .................. 280/743.2; 280/728.2; 280/730.2

(58) Field of Classification Search
  USPC ........... 280/728.2, 730.1, 730.2, 743.1, 743.2
  See application file for complete search history.

(56) References Cited

U.S. PATENT DOCUMENTS

| | | | |
|---|---|---|---|
| 5,860,673 A | 1/1999 | Hasegawa et al. | |
| 5,927,749 A | 7/1999 | Homier et al. | |
| 5,967,546 A | 10/1999 | Homier et al. | |
| 6,045,151 A * | 4/2000 | Wu | 280/728.3 |
| 6,062,594 A * | 5/2000 | Asano et al. | 280/730.2 |
| 6,206,466 B1 | 3/2001 | Komatsu | |
| 6,386,577 B1 | 5/2002 | Kan et al. | |
| 6,450,528 B1 | 9/2002 | Suezawa et al. | |
| 6,457,741 B2 | 10/2002 | Seki et al. | |
| 7,445,234 B2 | 11/2008 | Hofmann | |
| 7,641,226 B2 * | 1/2010 | Sundmark et al. | 280/730.2 |
| 7,789,419 B2 * | 9/2010 | Smith | 280/730.2 |
| 2001/0019202 A1 * | 9/2001 | Holdampf et al. | 280/730.2 |
| 2002/0130495 A1 | 9/2002 | Lotspih et al. | |
| 2005/0156412 A1 * | 7/2005 | Panagos et al. | 280/730.2 |
| 2006/0113759 A1 * | 6/2006 | Tracht et al. | 280/730.2 |
| 2006/0113773 A1 * | 6/2006 | Tracht | 280/730.2 |
| 2006/0119083 A1 * | 6/2006 | Peng et al. | 280/730.2 |
| 2007/0057493 A1 | 3/2007 | Ritzel et al. | |
| 2007/0085308 A1 * | 4/2007 | Tracht et al. | 280/730.2 |
| 2007/0164545 A1 * | 7/2007 | Muller | 280/730.2 |
| 2008/0061539 A1 * | 3/2008 | Paruszkiewicz et al. | 280/730.2 |
| 2008/0217892 A1 * | 9/2008 | Maripudi et al. | 280/740 |
| 2008/0284143 A1 * | 11/2008 | Smith et al. | 280/730.2 |
| 2009/0243263 A1 * | 10/2009 | Smith | 280/728.2 |
| 2009/0243266 A1 * | 10/2009 | Smith | 280/730.2 |
| 2010/0244414 A1 * | 9/2010 | Gilbert et al. | 280/730.1 |
| 2012/0068442 A1 * | 3/2012 | Wagner | 280/730.2 |

FOREIGN PATENT DOCUMENTS

GB    2398546 A    8/2004

OTHER PUBLICATIONS

German Office Action Dated Oct. 8, 2010, Application No. 10 2010 001 772.8-56, Applicant Lear Corporation, 4 Pages.

* cited by examiner

*Primary Examiner* — Paul N Dickson
*Assistant Examiner* — Barry Gooden, Jr.
(74) *Attorney, Agent, or Firm* — Brooks Kushman P.C.

(57) ABSTRACT

A vehicle seat assembly may include an air bag module having an inflatable air bag, a housing that receives the air bag, and a flexible member disposed in the housing and having an end. The seat assembly may further include a seat pad disposed outside the housing. Upon inflation of the air bag, the end of the flexible member is configured to extend outside the housing such that the end extends between a portion of the seat pad and the air bag.

19 Claims, 3 Drawing Sheets

VEHICLE SEAT ASSEMBLY WITH SEAT PAD PROTECTION MEMBER

CROSS-REFERENCE TO RELATED APPLICATIONS

This application claims foreign priority benefits under 35 U.S.C. §119(a)-(d) to DE 10 2010 001 772.8, filed Feb. 10, 2010, which is hereby incorporated by reference in its entirety.

BACKGROUND

1. Field of the Disclosure

The present disclosure relates to a vehicle seat assembly having an inflatable air bag.

2. Background Art

Vehicle seat assemblies may be provided with inflatable air bags. U.S. Pat. Nos. 6,045,151 and 6,237,934 disclose examples of such vehicle seat assemblies.

SUMMARY

A vehicle seat assembly according to the present disclosure may include an air bag module having an inflatable air bag, a housing that receives the air bag, and a flexible member disposed in the housing and having an end. The seat assembly may further include a seat pad disposed outside the housing. Upon inflation of the air bag, the end of the flexible member is configured to extend outside the housing such that the end extends between a portion of the seat pad and the air bag.

An air bag module for use with a vehicle seat having a seat pad may include an inflatable air bag, a housing that receives the air bag, and a flexible member disposed in the housing and having an end. Upon inflation of the air bag, the end of the flexible member is configured to extend outside the housing such that the end extends between a portion of the seat pad and the air bag.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various vehicle seat configurations that include an inflatable air bag assembly. Several specific embodiments are set forth in the following description and in FIGS. 1-6 to provide a thorough understanding of certain embodiments according to the present disclosure. As those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without several of the specific features explained in the following description.

Figure 1:
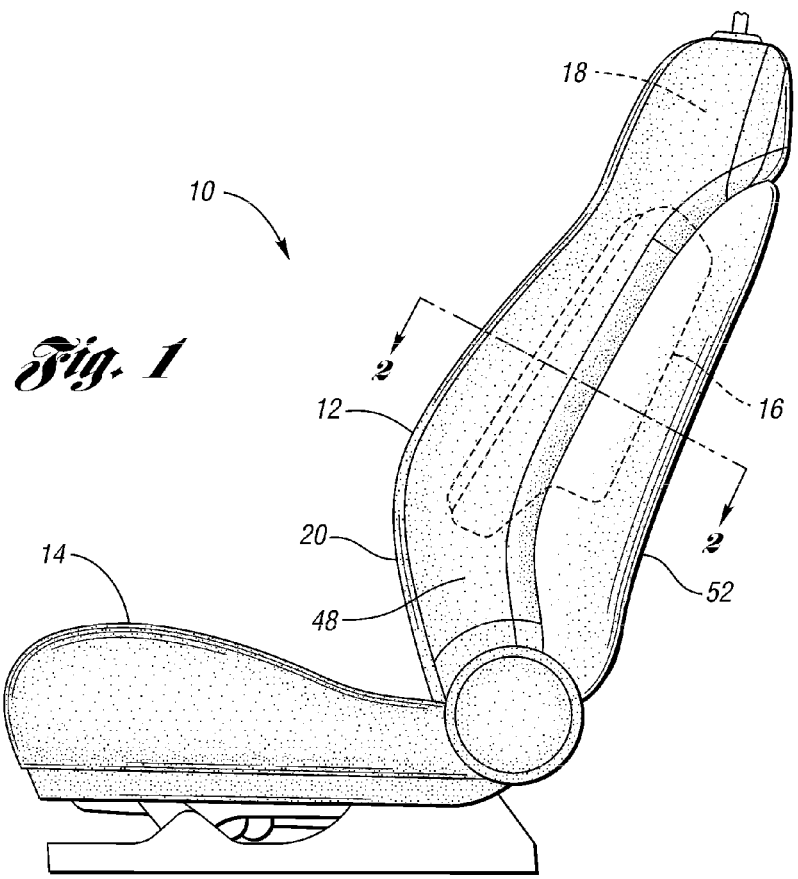
FIG. 1 is a side view of a vehicle seat assembly according to the present disclosure and including an air bag module positioned in a seat back cushion assembly.

FIG. 1 shows a vehicle seat assembly 10 according to the present disclosure for use in a motor vehicle. The seat assembly 10 includes a seat back cushion assembly 12 and a seat bottom cushion assembly 14 attached to the seat back cushion assembly 12. The seat back cushion assembly 12 includes an air bag arrangement or assembly, such as an air bag module 16, a seat pad 18 overlaying the air bag module 16, and a trim cover 20 overlaying the seat pad 18 and air bag module 16.

Figure 2:
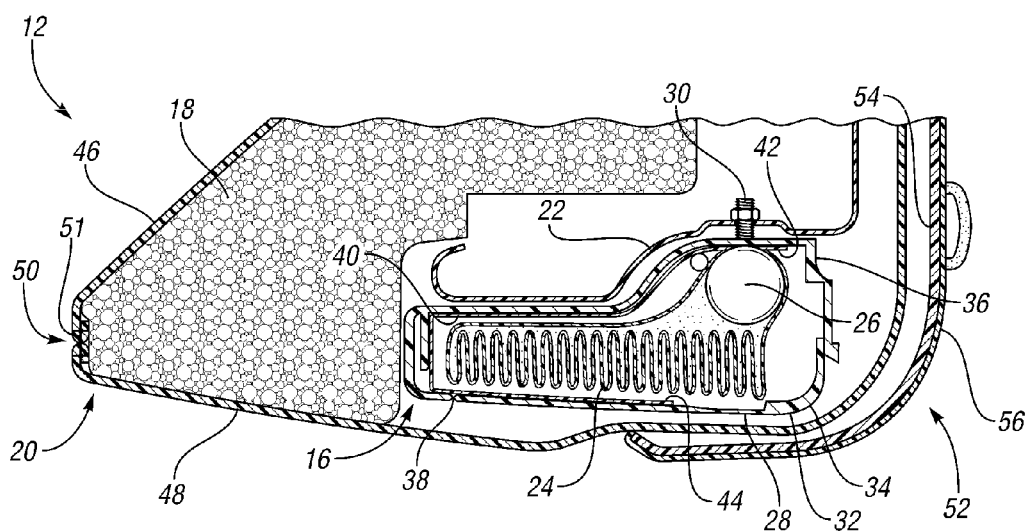
FIG. 2 is a fragmentary cross-sectional view of the seat back cushion assembly taken along line 2-2 of FIG. 1 and showing various components of the air bag module, including an inflatable air bag, a housing that receives the air bag and a flexible member disposed in the housing.

As shown in FIG. 2, the air bag module 16 may be disposed proximate one side of the seat back cushion assembly 12, such as an outboard lateral side or an inboard lateral side, and may be connected to a support member, such as a seat back frame 22. Alternatively, the air bag module 16 may be located in any suitable position on the seat back cushion assembly 12 or seat bottom cushion assembly 14. Furthermore, the seat back cushion assembly 12 and seat bottom cushion assembly 14 may each be provided with multiple air bag modules 16, such as outboard and inboard air bag modules 16 that each have a similar configuration and function as described below in detail.

In the embodiment shown in FIG. 2, the air bag module 16 includes an inflatable air bag 24, an inflator 26 attached to the air bag 24 for inflating the air bag 24, and a housing 28 that receives the air bag 24 and inflator 26. The inflator 26 may be connected to the frame 22, or other suitable support member, in any suitable manner, such as with one or more fasteners 30. The fasteners 30, which may each include a bolt and nut for example, may also be used to connect the housing 28 to the frame 22. Alternatively, the air bag module 16 may be connected to the frame 22, or other suitable support member, in any suitable manner.

The housing 28 may have a body 32, such as a clam-shell body, that substantially surrounds the air bag 24 and inflator 26. The body 32 may comprise a relatively rigid molded plastic material, such as polypropylene. Alternatively, the body 32 may be made of any suitable material and in any suitable manner. For example, the body 32 may comprise a flexible plastic material.

Furthermore, the body 32 may include a deployment zone or location through which the air bag 24 may deploy, as described below in detail. In addition, the body 32 may have first and second housing portions 34 and 36, respectively, and be configured such that at least one housing portion is movable relative to the other housing portion upon inflation of the air bag 24.

In the embodiment shown in FIG. 2, the housing portions 34 and 36 are joined together by a rupturable portion or weakened area, such as a frangible groove or seam 38, that is configured to rupture upon inflation of the air bag 24 to allow both housing portions 34 and 36 to separate. As another example, ends of the housing portions 34 and 36 may be spaced apart from each other to define a deployment opening. As yet another example, the housing portions 34 and 36 may be joined together at a deployment location in any suitable manner, such as with one or more temporary or breakable fasteners.

As further shown in FIG. 2, the air bag module 16 includes a flexible member 40 disposed in the housing 28. The flexible member 40 may be made in any suitable manner and of any suitable material. For example, the flexible member 40 may be a plastic sheet, a fleece, or a cloth or other pliable material made of natural and/or synthetic fibers. In one embodiment, for example, the flexible member 40 may be made of nylon. In another embodiment, the flexible member 40 may be made of a non-woven material such as Tyvek®.

In the embodiment shown in FIG. 2, the flexible member 40 is disposed between the air bag 24 and the housing 28, and the flexible member 40 extends along front and side portions of the interior surface of the housing 28. Furthermore, the flexible member 40 has a first secured end 42, and a second releasable end 44. In the embodiment shown in FIG. 2, the first end 42 is located on an interior inboard side of the housing 28 and is attached to the housing 28 and frame 22 with one or more of the fasteners 30.

Alternatively, the first end 42 may be secured in any suitable manner. For example, the first end 42 may be attached to an interior surface of the housing 28 with adhesive and/or one or more fasteners. As another example, the first end 42 may be attached to the air bag 24 and/or inflator 26. As a more detailed example, the first end 42 may be sewn to the air bag 24 or formed integrally with the air bag 24.

In the embodiment shown in FIG. 2, the second end 44 of the flexible member 40 is disposed on an interior outboard side of the housing 28 adjacent an outboard side of the air bag 24. Furthermore, the second end 44 extends rearwardly of the frangible groove 38 of the housing 28. As explained below, the second end 44 is configured to be released from the interior of the housing 28 during deployment of the air bag 24. For example, the second end 44 may be a free end or it may be temporarily secured to the interior surface of the housing 28, such that the second end 44 is releasable from the interior of the housing 28 upon inflation of the air bag 24. As a more detailed example, the second end 44 may be releasably attached to the interior surface of the housing 28 with an adhesive tape and/or temporary fastener, such as a breakable fastener.

Referring to FIG. 2, the seat pad 18 may be disposed adjacent the air bag module 16 and the frame 22. For example, the seat pad 18 may be disposed in front of and along an inboard side of the air bag module 16 and frame 22, as shown in FIG. 2. As another example, the seat pad 18 may be disposed in front of and behind the air bag module 16 and frame 22. In at least one embodiment, the seat pad 18 is made from a molded polymeric material, such as a polyurethane foam. Alternatively, the seat pad 18 may comprise any suitable material, and may be made in any suitable manner.

The trim cover 20 may be made of any suitable material, such as cloth, vinyl and/or leather, and may be provided with or without a padding layer and/or backing layer. Furthermore, the trim cover 20 may include multiple pieces that are joined together at seams. Referring to FIGS. 1 and 2, the trim cover 20 includes first and second sections 46 and 48, respectively, that cooperate to define a deployment seam 50 through which the air bag 24 may deploy. For example, the sections 46 and 48 may be connected together such as with sewn stitching 51, as shown in FIG. 2. As another example, ends of the first and second sections 46 and 48, respectively, may not be directly connected together, but merely abut each other to define the seam 50.

As is shown in FIGS. 1 and 2, in at least some embodiments, a relatively rigid panel 52 may also be provided in the rear area of the seat back cushion assembly 12 to provide support, to cover a portion of the seat back cushion assembly 12 and/or for aesthetics. The panel 52 may include a main body 54, such as a plastic molding. In addition, the panel 52 may include a cover layer 56 made of any suitable material, such as cloth, leather or vinyl, attached to the main body 54.

Figure 3:
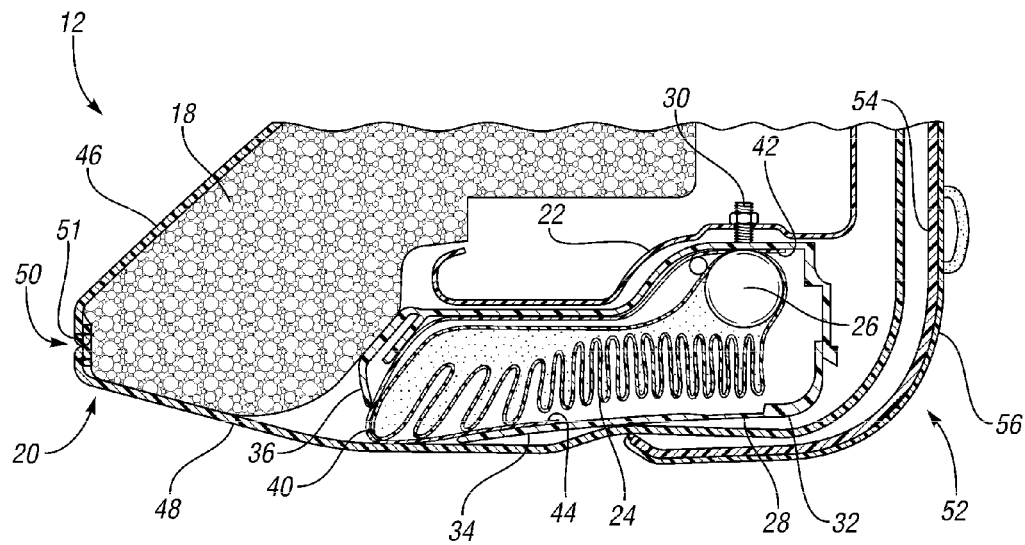
FIG. 3 is a fragmentary cross-sectional view of the seat back cushion assembly showing the air bag partially inflated.
Figure 4:
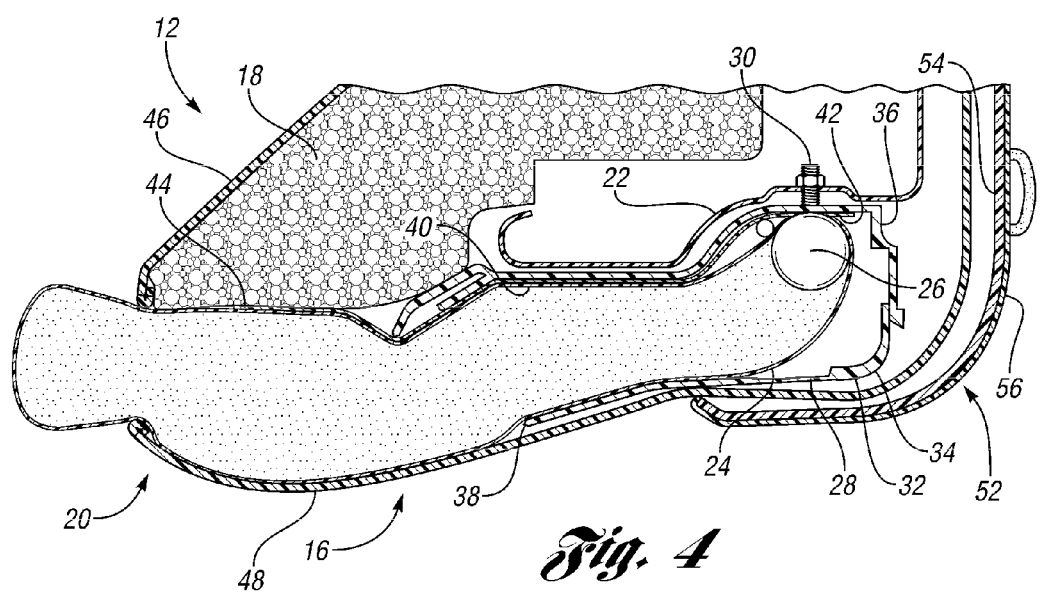
FIG. 4 is a fragmentary cross-sectional view of the seat back cushion assembly showing the air bag more fully inflated and the flexible member extending outside of the air bag module housing.

Referring to FIGS. 2-4, operation of the vehicle seat assembly 10 will now be described in detail. Upon a sufficient triggering event, such as impact to a vehicle in which the seat assembly 10 is mounted or other sufficient acceleration or deceleration event, for example, the air bag module 16 may be activated in any suitable manner to cause the air bag 24 to deploy. During deployment, the inflator 26 inflates the air bag 24, which causes the housing 28 to open. In the embodiment shown in FIGS. 2 and 3, for example, the inflating air bag 24 causes the frangible seam 38 to rupture, and further causes the first housing portion 34 to flex outwardly and the second housing portion 36 to move forwardly after the frangible seam 38 has ruptured. As also shown in FIG. 3, the expanding air bag 24 may cause the flexible member 40 to extend outside of the housing 28.

Referring to FIG. 4, as the air bag 24 continues to inflate, the air bag 24 may cause the second end 44 of the flexible member 40 to be released from the housing 28, such that the second end 44 extends between the seat pad 18 and the air bag 24. The inflating air bag 24 may also rupture the deployment seam 50 so that the air bag 24 may project through the trim cover 20.

With the above configuration, the flexible member 40 may protect the seat pad 18 and inhibit or prevent portions of the seat pad 18 from breaking off during deployment of the air bag 24. The flexible member 40 may also facilitate deployment of the air bag 24 by providing a guide surface for the air bag 24 and/or by reducing friction between the air bag 24 and the seat pad 18 or other components of the seat assembly 10.

Figure 5:
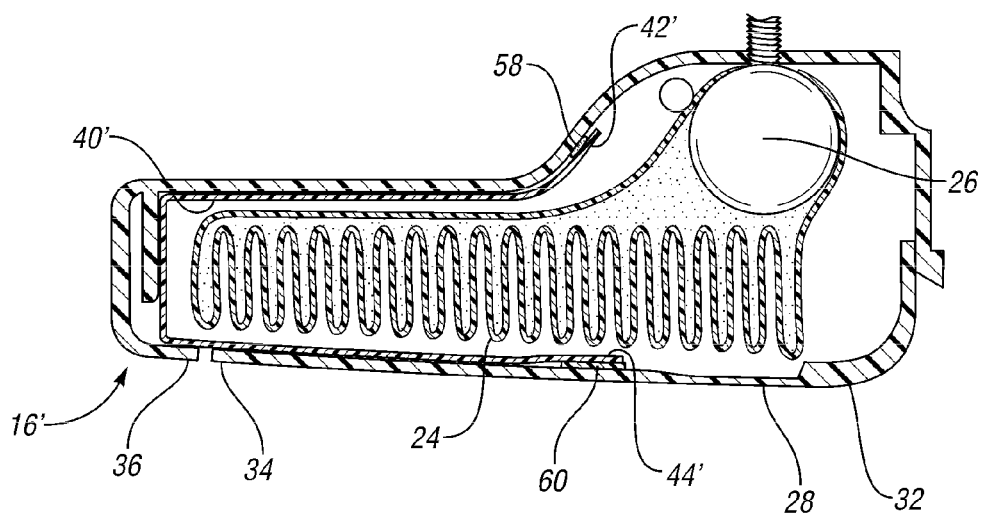
FIG. 5 is a cross-sectional view of another embodiment of an air bag module according to the present disclosure.
Figure 6:
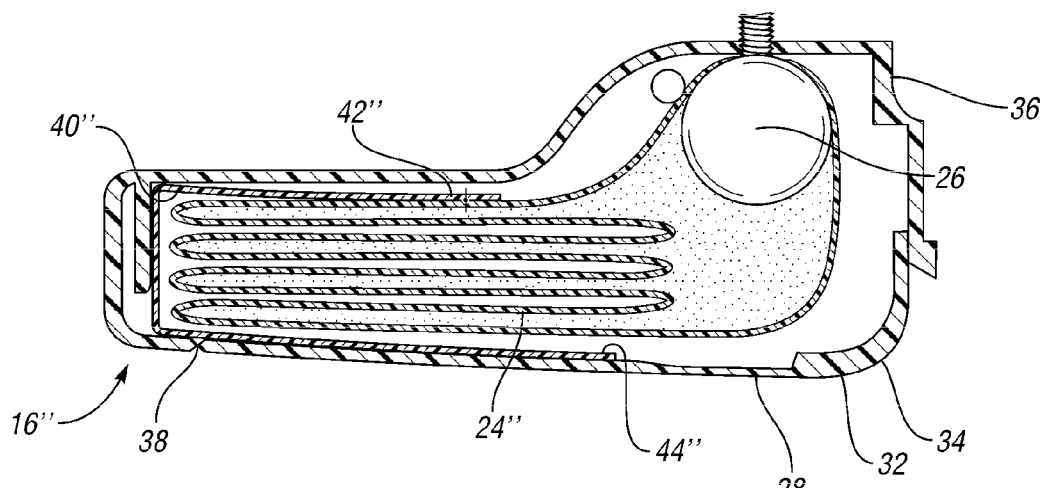
FIG. 6 is a cross-sectional view of yet another embodiment of an air bag module according to the present disclosure.

FIGS. 5 and 6 show other example embodiments of air bag modules according to the present disclosure for use with a vehicle seat assembly, such as seat assembly 10. These embodiments function in a similar manner as discussed above in detail.

In the embodiment 16' shown in FIG. 5, flexible member 40' has a first end 42' secured directly to the interior surface of housing 28, such as with an adhesive 58. Flexible member 40' further has a second end 44' releasably secured to the interior surface of the housing 28, such as with adhesive tape 60.

In the embodiment 16" shown in FIG. 6, flexible member 40'" has a first end 42" that is attached to air bag 24. For example, the first end 42" may be sewn to the air bag 24 or formed integrally with the air bag 24. Flexible member 40" further has an opposite free second end 44". As another example, second end 44" may be temporarily secured to the housing 28 and/or air bag 24, such that second end 44" is releasable from the housing 28 upon inflation of the air bag 24.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
an air bag module including an inflatable air bag, a housing that receives the air bag, and a flexible member disposed in the housing and having an end;
a seat pad disposed outside the housing; and
a trim cover overlaying the seat pad;

wherein, upon inflation of the air bag, the air bag is deployable through the trim cover, and the end of the flexible member is configured to extend outside the housing such that the end does not extend beyond the trim cover, and such that the end extends between a portion of the seat pad and the air bag outside of the housing.

2. The seat assembly of claim 1 wherein the flexible member has an opposite end connected to the housing.

3. The seat assembly of claim 1 further comprising a seat frame and a fastener that connects the housing and the flexible member to the seat frame.

4. The seat assembly of claim 1 wherein the flexible member comprises fabric.

5. The seat assembly of claim 1 wherein the flexible member comprises nylon.

6. The seat assembly of claim 1 wherein the housing comprises plastic.

7. The seat assembly of claim 1 wherein the end of the flexible member is releasably connected to the housing, such that the end is releasable from the housing upon inflation of the air bag.

8. The seat assembly of claim 1 wherein the flexible member has a section connected to the air bag.

9. The seat assembly of claim 8 wherein the section of the flexible member is sewn to the air bag.

10. A vehicle seat assembly comprising:
   an air bag module including an inflatable air bag, a housing that receives the air bag, and a seat pad protection member disposed in the housing, the protection member having first and second ends, the first end being connected to the housing or the air bag, and the second end being disposed on an outboard side portion of the air bag;
   a seat pad disposed in front of the housing; and
   a trim cover overlaying the seat pad and having a deployment seam through which the air bag is deployable upon inflation;
   wherein, upon inflation of the air bag, the second end of the protection member is configured to extend outside the housing such that the second end extends between the seat pad and the air bag outside of the housing, and such that the second end terminates before an inner side of the trim cover.

11. The seat assembly of claim 10 further comprising a seat frame and a fastener that connects the housing to the seat frame, wherein the fastener further connects the first end of the protection member to the housing.

12. The seat assembly of claim 10 wherein the first end of the protection member is connected to the air bag.

13. The seat assembly of claim 10 wherein the housing has a deployment location through which the air bag is deployable, and the protection member extends along a front side portion and the outboard side portion of the air bag such that the second end of the protection member is disposed rearwardly of the deployment location.

14. The seat assembly of claim 10 wherein the protection member comprises nylon.

15. The seat assembly of claim 10 wherein the housing has an interior surface, and the second end of the protection member is releasably connected to the interior surface of the housing, such that the second end is releasable from the housing upon inflation of the air bag.

16. An air bag module for use with a vehicle seat having a seat pad and a trim cover overlaying the seat pad, the air bag module comprising:
   an inflatable air bag;
   a housing that receives the air bag, the housing having an interior surface; and
   a flexible member disposed in the housing and having an end that is releasably connected to the interior surface of the housing with adhesive;
   wherein, upon inflation of the air bag, the end of the flexible member is configured to be released from the interior surface of the housing and extend outside the housing such that the end extends between a portion of the seat pad and the air bag outside of the housing.

17. The air bag module of claim 16 wherein the flexible member has an opposite end connected to the housing.

18. The air bag module of claim 16 wherein the flexible member has a section connected to the air bag.

19. The air bag module of claim 18 wherein the section of the flexible member is sewn to the air bag.

* * * * *